July 10, 1928.
H. J. JONES
1,677,094
TRANSMISSION MEANS
Filed March 13, 1926
8 Sheets-Sheet 3
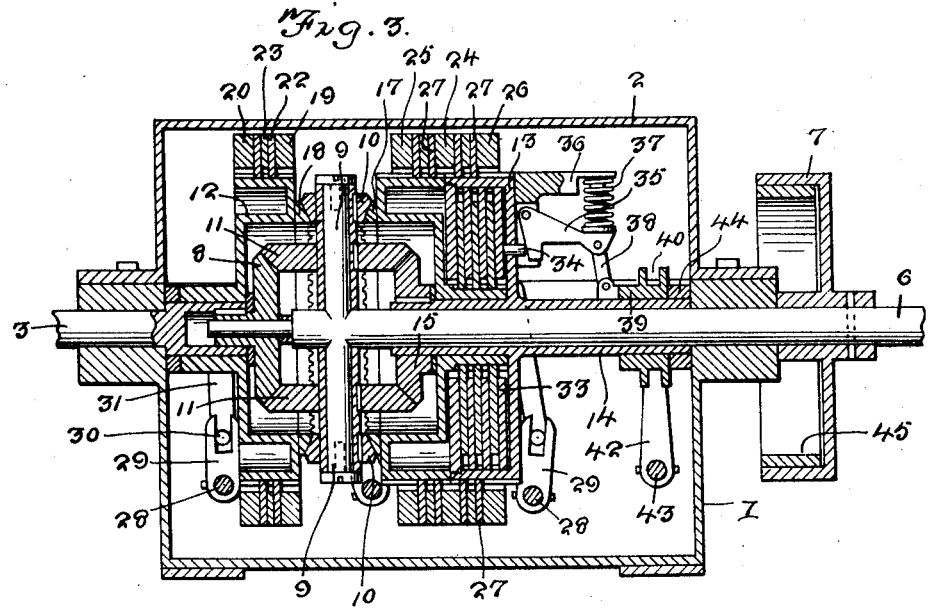
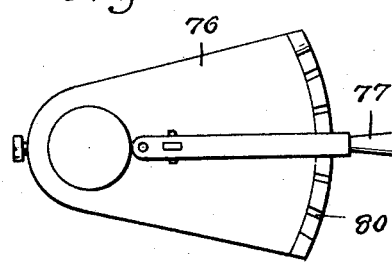
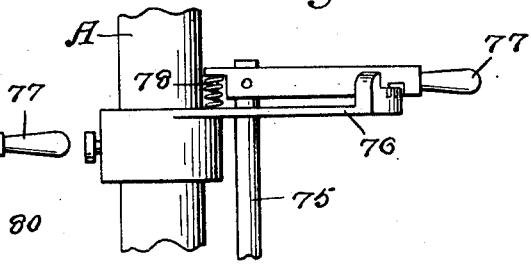

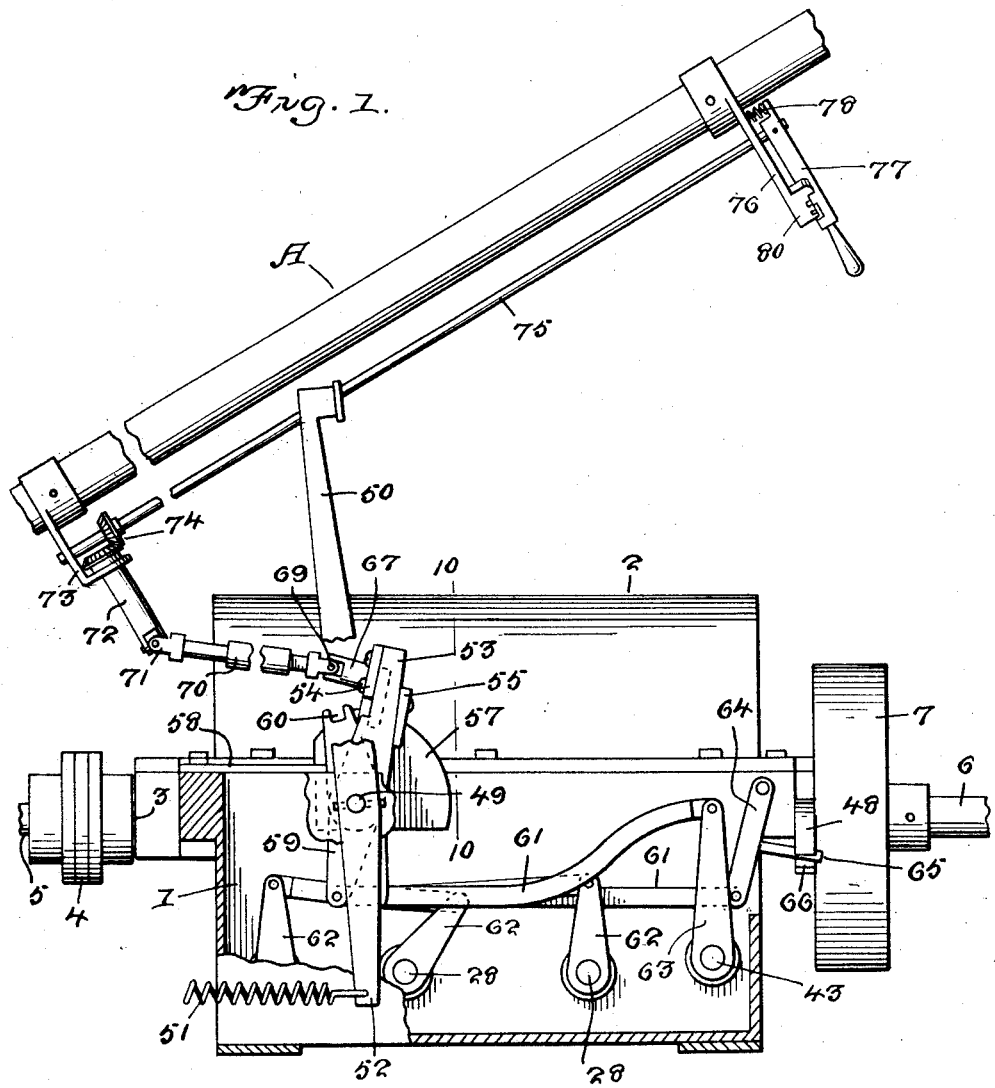

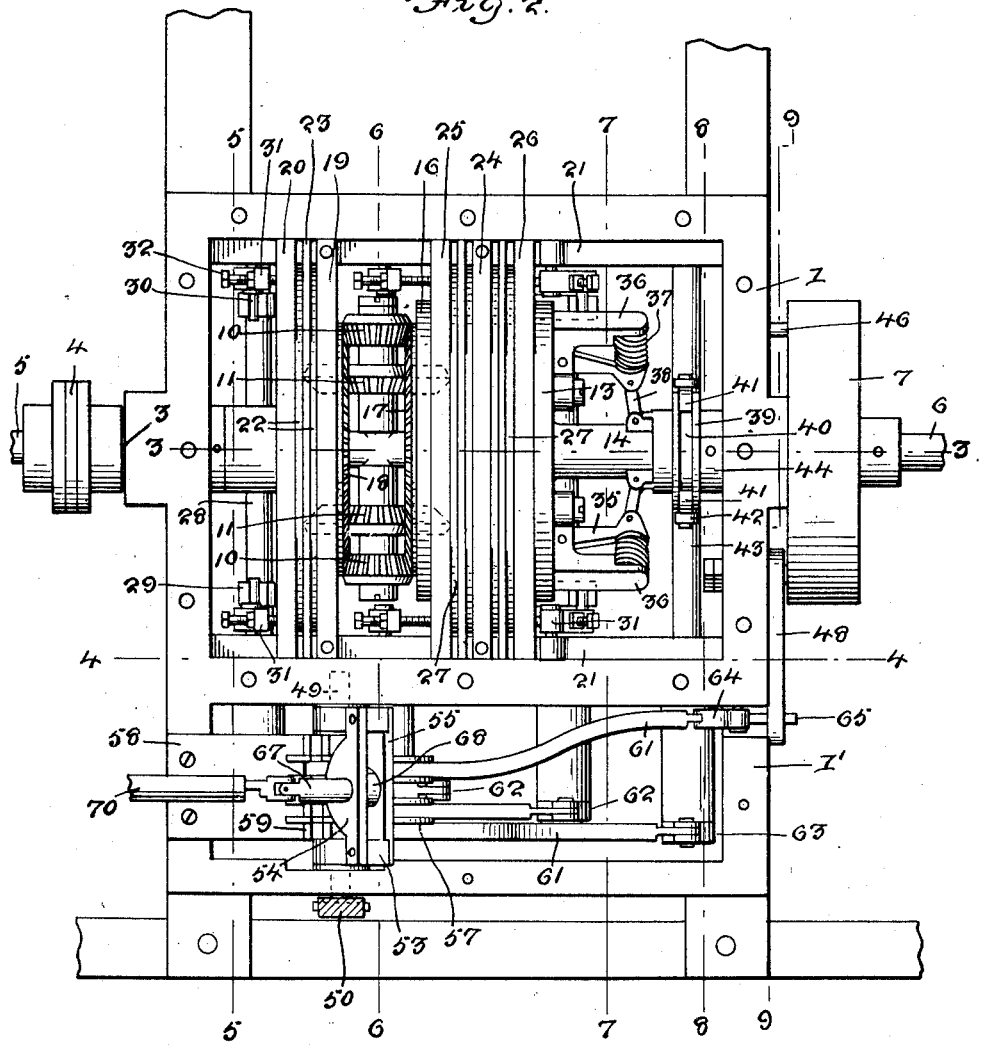

July 10, 1928.   1,677,094
H. J. JONES
TRANSMISSION MEANS
Filed March 13, 1926   8 Sheets-Sheet 4
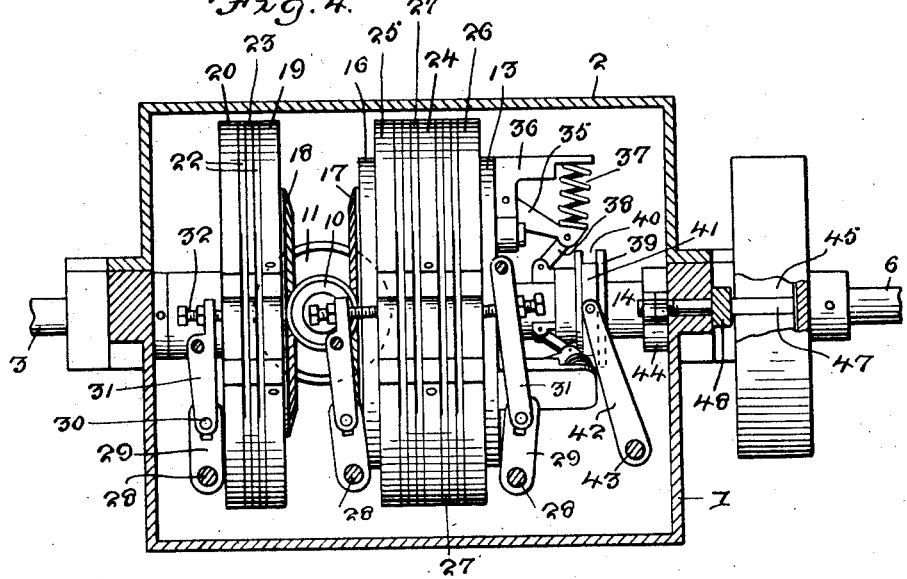
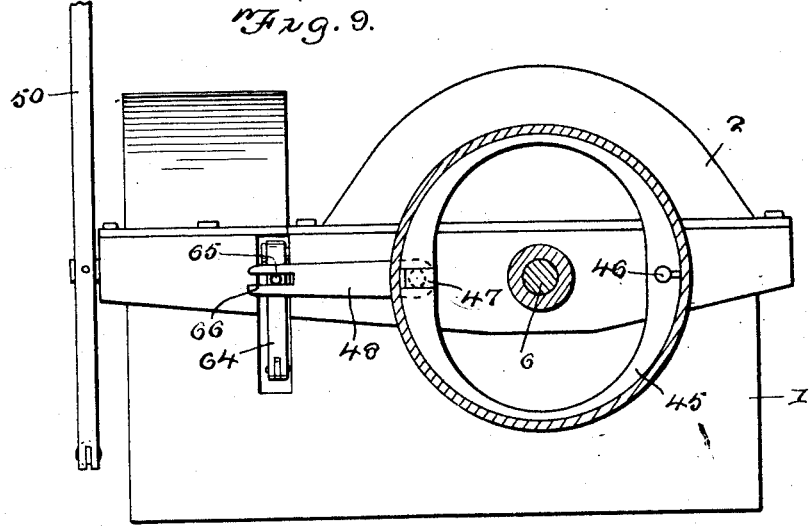

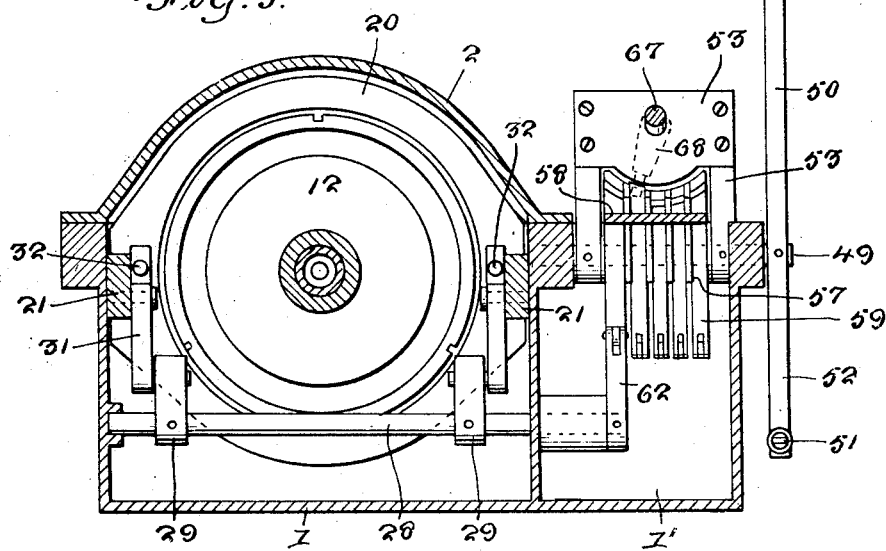
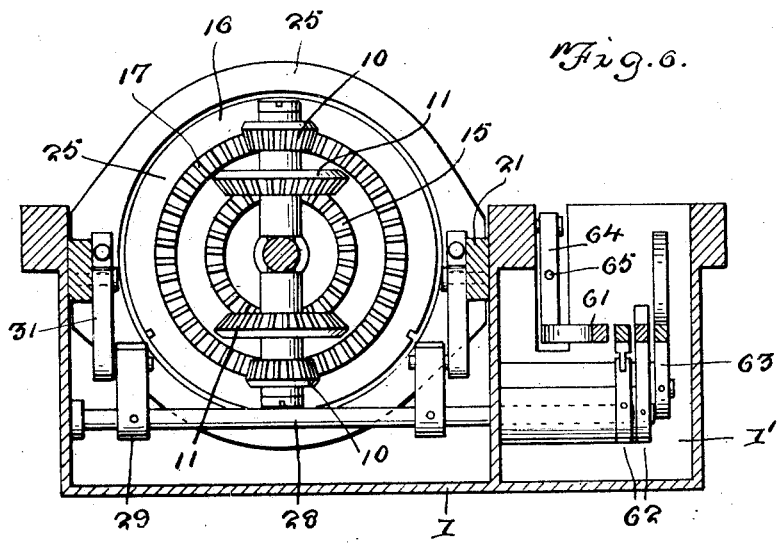

July 10, 1928.  
H. J. JONES  
TRANSMISSION MEANS  
Filed March 13, 1926

Hugh J. Jones
INVENTOR

BY Victor J. Evans
ATTORNEY

WITNESS:

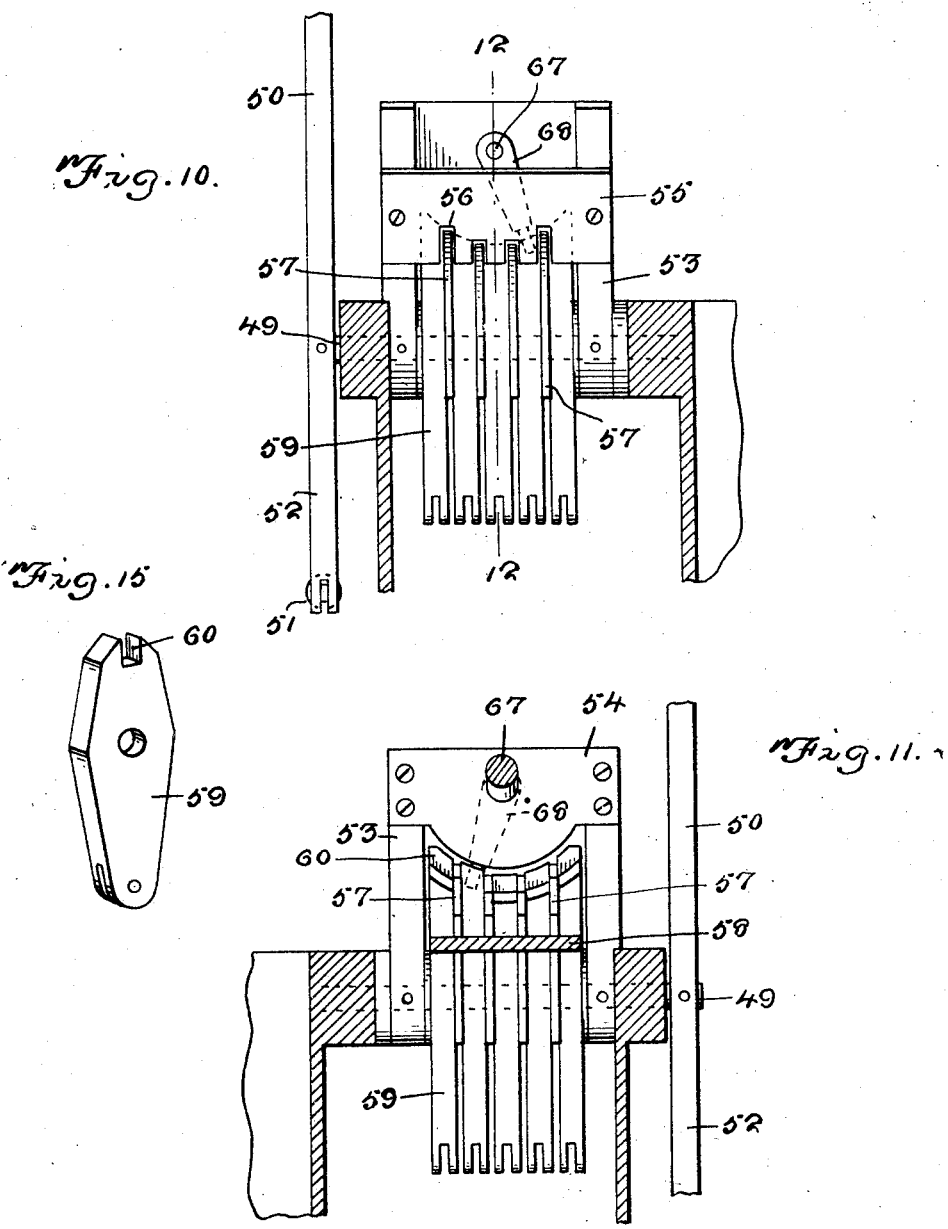

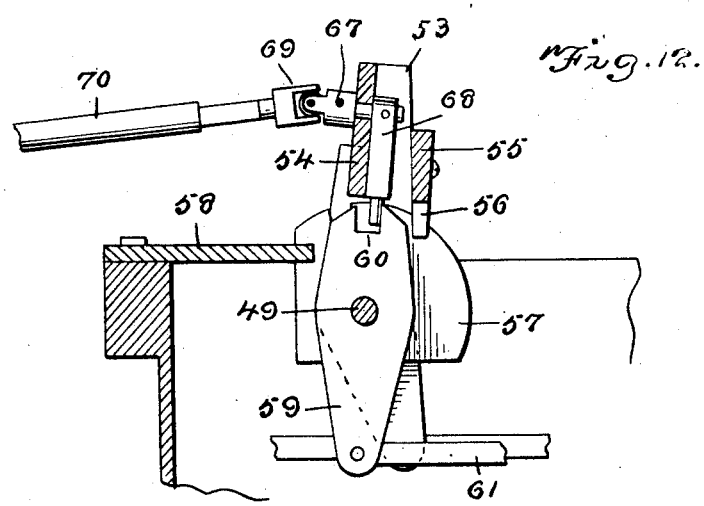
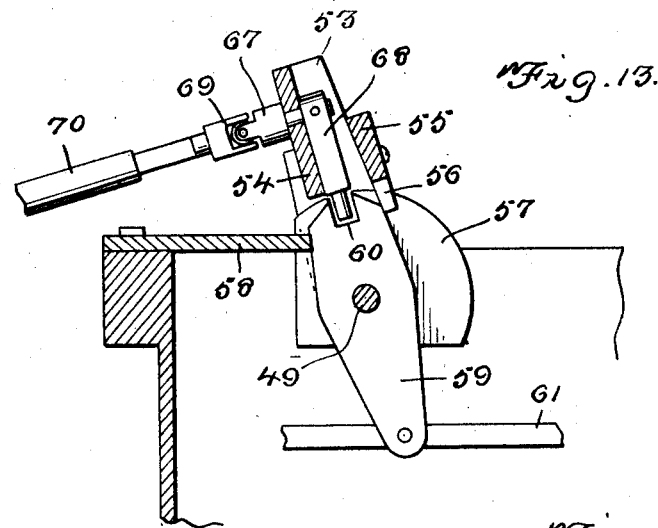
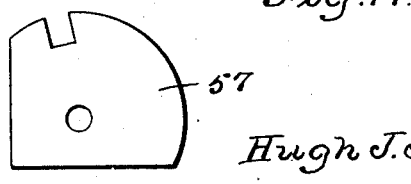

Patented July 10, 1928.

1,677,094

UNITED STATES PATENT OFFICE.

HUGH J. JONES, OF DENVER, COLORADO, ASSIGNOR OF ONE-HALF TO THE WESTERN BATTERY & SUPPLY COMPANY, OF DENVER, COLORADO, A CORPORATION OF COLORADO, AND TEN PER CENT TO GEORGE A. BIBLE, OF RAWLINS, WYOMING, AND P. M. BIBLE, OF DENVER, COLORADO.

TRANSMISSION MEANS.

Application filed March 13, 1926. Serial No. 94,541.

This invention relates to transmission means for motor vehicles and the like, the general object of the invention being to provide a simple type of planetary means providing a number of forward movements and a reverse movement, with pedal actuated means for operating the parts to set them for the desired movement and selective means operated by a hand lever, arranged adjacent the steering wheel, for setting the pedal operated means in active position.

Another object of the invention is to provide a brake for the device which is also controlled by the pedal operated means and the selective means.

A further object of the invention is to provide clutch disks for holding the various parts of the transmission means stationary so that brake bands, usually used for this purpose, are eliminated.

A still further object of the invention is to so arrange the high speed clutch that practically all wear is eliminated on the parts thereof.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a fragmentary elevation showing the device applied to a motor vehicle, parts being broken away and parts being in section.

Figure 2 is a plan view with the covers removed.

Figure 3 is a sectional view taken through the center of Figure 4.

Figure 4 is a section on line 4—4 of Figure 2.

Figure 5 is a section on line 5—5 of Figure 2.

Figure 6 is a section on line 6—6 of Figure 2.

Figure 9 is a section on line 9—9 of Figure 2.

Figure 10 is a section on line 10—10 of Figure 1.

Figure 11 is a view similar to Figure 10, but showing the parts in a different position.

Figure 12 is a section on line 12—12 of Figure 10.

Figure 13 is a similar view, but showing the parts in a different position.

Figure 14 is a view of one of the guiding plates shown in Figures 12 and 13.

Figure 15 is a view of one of the pedal operated rocking members.

Figure 16 is a view of the hand lever and its sector.

Figure 17 is an elevation of the hand operated parts on the steering column.

Figure 18 is a view of the hand lever.

Figure 7:
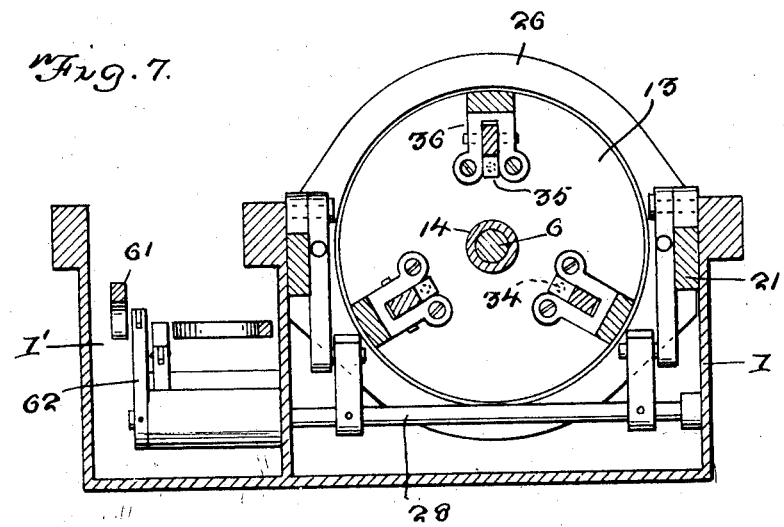
Figure 7 is a section on line 7—7 of Figure 2.
Figure 8:
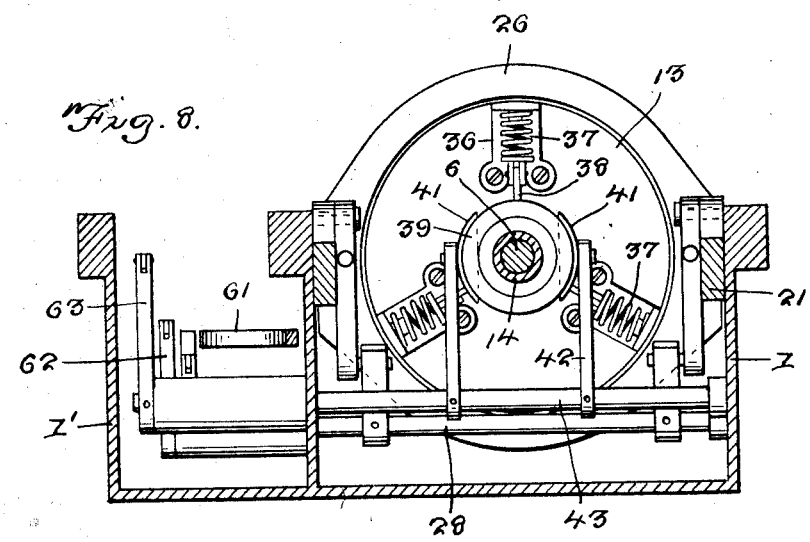
Figure 8 is a section on line 8—8 of Figure 2.

In these views, 1 indicates the casing for the transmission means which is provided with a suitable cover 2, a gasket being arranged between the casing and cover so that lubricant can be placed in the casing to lubricate the moving parts. A shaft 3 is journaled in one end of the casing and is connected by the flexible coupling 4 with the crank shaft 5 of the motor. The transmission shaft 6 passes through the other end of the casing and may be connected with the jack shaft by the usual universal joint and has fastened thereto the brake drum 7. The inner end of the shaft 6 has a reduced end which extends into a socket in the shaft 3 and said reduced end forms a bearing for a gear 8 which is keyed in the socket of the shaft 3 so that said gear 8 rotates with the shaft 3 around the reduced end of the shaft 6. Said shaft 6 is provided with a pair of transversely extending arms 9, each of which has rotatably mounted thereon a small gear 10 and a large gear 11, the gears 11 meshing with the gear 8.

A drum 12 is rotatably mounted on the inner end of the shaft 3 and a drum 13 is formed on a hollow shaft 14 which is rotatably mounted on the shaft 3. The inner end of the hollow shaft carries a gear 15 which is engaged by the gears 11 on the arms 9 of the shaft 6. A third drum 16 is rotatably mounted on the hollow shaft 14 and is arranged in front of the drum 13. This drum 16 carries a ring gear 17, while the drum 12 carries a similar gear 18. These ring gears are engaged by the gears 10 on the arms of the shaft 14.

A stationary ring 19 surrounds the drum 12 and a push ring 20 surrounds said drum and is slidably supported in the casing by means of the guide bars 21 horizontally arranged at the sides of the casing, the ring being provided with slots for engaging the bars. Clutch means or disks 22 are keyed to the drum so that they can have sliding movement thereon and a similar ring 23 is arranged between the rings 22 and is slidably but non-rotatably supported in the casing, such as by the bars 21. Thus when the push ring 20 is moved toward the stationary ring 19, the clutch disks or rings will frictionally engage each other and thus movement of the drum 12 will be prevented so that the ring gear 18 will be held stationary.

A stationary ring 24 is associated with the drums 13 and 16, the drum 16 being provided with a push ring 25 and the drum 13 with a push ring 26, clutch disks 27 being arranged between these push rings and the stationary ring for holding these drums 13 and 16 stationary when the push rings are moved toward the stationary ring. These parts are similar to the clutch means associated with the drum 12. A rock shaft 28 is associated with each drum and passage transversely through the casing with one end projecting from the casing. Each rock shaft has fastened thereto a pair of arms 29, the upper ends of which are slotted to receive pins 30 on the lower ends of the levers 31 which are pivoted to the bars 21 and which have the pins 32 adjustably arranged in their upper ends for engaging the push ring of each drum so that when the rock shaft 28 is moved in one direction, the arms 29 will rock the levers 31 and cause the pins 32 to engage a push ring and force the same toward the stationary ring and thus frictionally engage the clutch disks to prevent movement of the drum.

Clutch disks 33 are placed between the drums 13 and 16, one set of disks being carried by the drum 13 and the other set by the drum 16 so that when the disks are forced into frictional engagement the drums will be locked together. Pins 34 are carried by the drum 13 and are engaged by the levers 35 pivoted to the brackets 36 carried by the drum. Springs 37, carried by the brackets, engage the levers 35 and tend to force them inwardly against the pins 34 to cause said pins to place the disks 33 into frictional engagement. Each lever 35 is connected by a link 38 with a collar 39 slidably mounted on the hollow shaft 4 and having a groove 40 therein. This groove receives the shoes 41 pivotally connected with the upper ends of the arms 42 which are carried by the shaft 43 passing transversely through the casing with one end projecting therefrom. Thus when the shaft 43 is rocked, the collar 39 will be moved longitudinally on the shaft 14 toward and away from a stationary collar 44 at the rear end of the casing and surrounding the end of the shaft 14. The parts are so arranged that when the collar 39 moves each link 38 to either side of a line passing through the longitudinal center of each spring 37, the spring will act to complete the movement of the parts by its pressure against the outer end of the lever 35. Thus the springs 37 will hold the collar 39 against the collar 44, so that little, if any wear will come upon the shoes 41 when the said collar is in a position with the levers 35 in neutral position. When the collar 39 is moved toward the drum 13, the springs 37 will be permitted to move the levers 35 a sufficient distance to cause the pins 34 to place the clutch disks in frictional engagement to lock the drum 13 to the drum 16.

A pair of brake elements 45 of practically semicircular form is arranged in the drum 7 and is hinged to the casing, as shown at 46, and the free ends of these elements are engaged by a cam 47 which is carried by a lever 48 so that when said lever is rocked in one direction, the large part of the cam, engaging the ends of the elements 45, will expand said elements against the drum and thus brake the shaft.

A shaft 49 is journaled in an extension 1' of the casing 1 and a foot pedal 50 is fastened to one end of the shaft which projects from the extension. A spring 51 connects the dependent part 52 of the stem of the pedal with a stationary part so that the pedal is normally held in raised position. A frame 53 is connected with the shaft 49 so that it will move with the pedal and said frame has a front plate 54 provided with an arc-shaped depending portion and a rear plate 55 which is formed with notches 56 in its lower edge, the outer notches being longer than the inner notches. Guiding plates 57 are supported by a plate 58 carried by the extension of the casing and these guiding plates are vertically arranged and have arc-shaped outer edges which enter the notches 56. A plurality of rocker arms 59 are loosely mounted on the shaft 49. These rocker arms are guided by the plates 57, there being a rocker arm between each pair of plates and in the space between each outer plate and the side piece of the pedal frame. The rocker arms have their upper ends arranged in the form of a crescent to receive the arc-shaped part of the plate 54 and each rocker arm has a notch 60 in its upper end. The lower end of each rocker arm is pivoted to a link 61. Three of these links are pivotally connected with the upwardly extending arms 62 on the ends of the shafts 28, a fourth link is pivotally connected to an arm 63 on the shaft 43 and the fifth link is connected with the lever 64 which is pivoted at its upper end to the casing and has a pin 65 thereon which engages a notch 66 in the outer end of the arm 48 so that when the lever 64 is moved, the arm 48 will also be moved.

A stub shaft 67 is journaled in the front plate 54 of the frame 53 and a finger 68 is fastened to this shaft within the frame and has its reduced lower end adapted to engage any one of the notches in the rocker arms 59 so as to connect the rocker arm with the frame and cause the arm to move with the frame. The stub shaft 67 is connected by a universal joint 69 with an extensible shaft 70 which is formed of two parts connected together by a sleeve and said extensible shaft is connected by a flexible joint 71 with a shaft 72 carried by a bracket 73 on the steering column A of the vehicle and this shaft 72 is connected by the gears 74 with a shaft 75 journaled in a bracket 73 and a sector 76 on the steering column. A hand lever 77 is pivoted to the upper end of the shaft 75 and a spring 78, engaging the inner end of the lever 77, tends to hold a tooth 79 thereon in engagement with any one of the teeth 80 on the sector.

From the foregoing, it will be seen that when the hand lever is moved, the shaft 75 will be partly rotated and this rotary movement will cause the finger 68 to oscillate in the frame 53 through means of the gears 74, shaft 72, extension shaft 70 and stub shaft 67. Thus the finger can be placed in a notch of any desired rocker arm 59 by manipulating the lever 77 and then by releasing the lever, the spring 78 will move it into engagement with the space between a pair of the teeth 80 and thus the parts will be held in adjusted position. Before the finger can be adjusted, the pedal must be depressed to move the frame 53 to a position where the finger can pass through the notches in the rocker arms. These rocker arms will be moved against the plate 58 by the rear plate 55 of the frame, as said frame moves forwardly. Thus the frame 53 will act to position the rocker arms if any of these rocker arms should happen to be in rearward position. The frame 53 is normally held in a rearward position by means of the spring 51 connected with the pedal 50. After the finger 68 has been moved to engage the notch of the desired rocker arm 59, the pedal is released so that its spring will raise it and thus move the frame 53 rearwardly, the finger 68 being attached to the frame, will cause the rocker arm with which it engages to rock on the shaft 49 and thus the link which is connected to said rocker arm will be moved longitudinally to rock the member to which it is attached. If the rocker arm, the link of which is attached to the arm, is moved, the pin 65 will swing the arm 48 downwardly which will cause the cam 47 to expand the brake members 45 and thus the transmission shaft will be held against movement. The shafts of the transmission means will remain in neutral position so that the said transmission means will be in neutral position and the engine of the vehicle can operate without moving the vehicle. When the hand lever has been moved into engagement with the left hand notch of the sector, the finger 68 will have been moved into engagement with the notch of the rocker arm 59 which is nearest the casing 1. Then when the pedal is released, this rocker arm will move rearwardly with the frame 53 so that the shaft 28, nearest the motor, will be rocked and the rocking of this shaft will cause the pusher plate 20 to move toward the stationary ring 19 and thus the clutch disks between these parts will be forced in engagement with each other and thus the drum 12 will be held against movement. The ring gear 18 will then become a stationary gear and as the shaft 3 is rotated by the engine, the gear 8 which is keyed to said shaft will be rotated and this movement communicated to the shaft 6 through the other gears, but said shaft 6 will move in an opposite direction to the shaft 3, due to the ring gear 18 being held stationary with the gears 10 moving around the same. Thus a reverse movement of the vehicle is secured.

By moving the hand lever into the next notch, the finger will engage the second rocker arm 59 so that when the pedal is released the brake is applied, as before explained, and the transmission mechanism will be in neutral position so that the parts can move without moving the shaft 6. By moving the hand lever into the third notch, the finger will be placed into engagement with the third rocker arm so that when the pedal is released, the shaft 28 of the clutch mechanism of the drum 16 will be rocked so that said drum will be held against movement by its clutch disk and therefor the ring gear 17 will become the stationary one. Drums 12 and 13 will idle, so that the drive will be as first explained, except that the shaft 6 will move in the same direction as the shaft 3 or the crank shaft. By moving the hand lever into the fourth notch, the finger will be placed into engagement with the fourth rocker arm 59 so that when the pedal is released, the shaft 28 of the clutch means or drum 13 will be rocked so that such clutch means will hold the drum 13 stationary. Thus the gear 15 will become the stationary one, while the drums 12 and 16 idle. This movement of the gears 11 around the gear 15 will cause the shaft 6 to rotate in the same direction as the shaft 3 but at a greater speed, which will give the second forward speed or movement. Then the hand lever is placed in the last notch which will move the finger into the notch of the left hand rocker arm 59 so that as the pedal is released, the shaft 43 will be rocked to throw the clutch collar 39 toward the drums, thus causing the clutch disks 33 to engage each other and locking the drums 13 and 16 together. This will lock all the gears together so that the device will move as a unit and the shaft 6 will be driven at the same speed as the shaft 3. This will give the high speed.

As will be seen, the finger is moved to engage the desired rocker arm by the hand lever and the bracket of this lever would be provided with suitable indications to indicate the notch in which it must be placed to give the vehicle the desired speed or to place the transmission means in neutral position. Before the lever can be moved, the pedal must be depressed so as to place the rocker arms in alignment to permit the finger to pass through the notches therein and come to rest in the desired notch. Then when the pedal is released, its spring will move the pedal and the frame rearwardly and the finger will carry the rocker arm with it. Thus this hand lever takes the place of a shifting lever and as it is located adjacent the steering wheel, it can be manipulated very easily and quickly. The change of speed is made wholly by the pedal and the hand lever and the brake is applied in the same manner. The transmission gives a reverse movement and three forward speeds or movements and the use of brake bands is eliminated, as the clutch disks are substituted for these bands. There is but little wear on the parts as the entire part of the transmission operates in a housing containing oil and the spring arrangement of the high speed clutch prevents wear of the parts thereof, as before explained. This planetary transmission has comparatively few parts and they are subjected to but little wear.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with transmission means including rock shafts, a spring controlled pedal actuated member, rocker arms associated with said member and connected with the rock shafts, a finger rotatably mounted on the pedal member, a hand lever and flexible means for connecting the hand lever with the finger to move the finger into engagement with any desired rocker arm.

2. In combination with transmission means including rock shafts and brake means associated with the transmission means, a spring controlled pedal actuated member, rocker arms associated with said member and connected with the rock shafts, one of the rocker arms being connected with the brake means, a hand lever, a finger connected with the pedal member and adapted to engage any one of the rocker arms and means for moving the finger by the hand lever.

3. In combination with transmission means including rock shafts and brake means associated with the transmission means, a plurality of rocker arms connected with the said rock shafts and the brake means, a frame having a part engaging the rocker arms to hold the same in neutral position, a pedal connected with the frame, spring means for moving the frame into active position and raising the pedal, a finger movably arranged in the frame, a hand lever and flexible means connecting the lever with the finger for moving the finger into engagement with any desired rocker arm.

4. In combination with the transmission means of a motor vehicle, a plurality of rocker arms connected with the rock shafts of such means, a rocker frame associated with the arms and having a rear part engaging the arms, a pedal connected with the frame for depressing the same to cause said rear part to move the arms to neutral position, spring means for moving the pedal and frame to raised position, a finger rotatably arranged in the frame, a lever associated with the steering wheel of the vehicle and a flexible connection between the lever and finger for moving the finger by the lever to place said finger in engagement with any desired rocker arm.

5. In combination with the transmission means of a motor vehicle, and its brake means, a plurality of rocker arms connected with the rock shafts of such means, one of the rocker arms being connected with the brake means, a rocker frame associated with the arms, a pedal connected with the frame, spring means for moving the pedal and frame rearwardly, a finger movably arranged in the frame and a lever connected with the finger for moving the same into engagement with any desired rocker arm.

6. In combination with a motor vehicle and its transmission means, a brake on the transmission means, a plurality of rocker arms connected with the rock shafts of the transmission means with one of said arms connected with the brake, a rocker frame associated with the arms, a pedal for actuating the frame, spring means for holding the pedal and frame in rearward position, a finger movably mounted on the frame, a lever connected with the steering column of the vehicle adjacent the steering wheel and a flexible connection between the lever and finger for moving the finger into engagement with any desired rocker arm.

7. In combination with a motor vehicle and its transmission means, a brake on the transmission means, a plurality of rocker arms connected with the rock shafts of the transmission means, with one of said arms connected with the brake, a rocker frame associated with the arms, a pedal for actuating the frame, spring means for holding the pedal and frame in rearweard position, a finger movably mounted on the frame for engaging any one of the rocker arms, a lever connected with the steering column adjacent the steering wheel and a flexible connection between the lever and finger which includes an extensible shaft for permitting rocking movement of the frame as well as rotary movement of the finger.

8. In combination with a motor vehicle and its transmission means, a plurality of rocker arms connected with the rock shafts of such means, a rocker frame associated with the arms, a pedal connected with the frame, spring means for moving the pedal and frame rearwardly, a finger movably arranged in the frame for engaging any one of the rocker arms, a bracket on the steering column adjacent the steering wheel, a lever carried by the bracket, a shaft rotatably supported on the column and connected with the lever, a second shaft geared to the first shaft, a shaft connected with the finger, an extensible shaft and flexible joints connecting the same with the last mentioned shafts.

In testimony whereof I affix my signature.

HUGH J. JONES.